US012754658B2

(12) United States Patent
Dinse et al.

(10) Patent No.: US 12,754,658 B2
(45) Date of Patent: Oct. 6, 2026

(54) ROOM TOUCHSCREEN TERMINAL

(71) Applicant: Rauland-Borg Corporation, Mount Prospect, IL (US)

(72) Inventors: Stacie Dinse, Des Plaines, IL (US); Peter Holtermann, Wilmette, IL (US); Alan Arsinow, Des Plaines, IL (US); Robert Gorelik, Wheeling, IL (US); Jeoff Hines, Grayslake, IL (US)

(73) Assignee: RAULAND-BORG CORPORATION, Mount Prospect, IL (US)

( * ) Notice: Subject to any disclaimer, the term of this patent is extended or adjusted under 35 U.S.C. 154(b) by 830 days.

(21) Appl. No.: 18/183,775

(22) Filed: Mar. 14, 2023

(65) Prior Publication Data

US 2024/0310979 A1 Sep. 19, 2024

(51) Int. Cl.
*G06F 3/0484* (2022.01)
*G06F 3/0488* (2022.01)
*H04L 67/306* (2022.01)

(52) U.S. Cl.
CPC .......... *G06F 3/0484* (2013.01); *G06F 3/0488* (2013.01); *H04L 67/306* (2013.01)

(58) Field of Classification Search
CPC .. G06F 3/0484; G06F 3/0488; G06F 3/04883; H04L 67/306
See application file for complete search history.

(56) References Cited

U.S. PATENT DOCUMENTS

| | | | | |
|---|---|---|---|---|
| 11,216,900 | B1 * | 1/2022 | Galyean | G06Q 50/26 |
| 2007/0101291 | A1 * | 5/2007 | Forstall | G06F 3/0482 715/805 |
| 2009/0217206 | A1 * | 8/2009 | Liu | G06F 3/04817 715/846 |
| 2010/0031198 | A1 * | 2/2010 | Zimmerman | G06F 3/0482 715/853 |
| 2010/0138763 | A1 * | 6/2010 | Kim | G06F 1/1643 715/810 |
| 2010/0269069 | A1 * | 10/2010 | Paila | G06F 3/04817 715/835 |
| 2011/0238506 | A1 * | 9/2011 | Perkowski | H04L 61/45 705/14.73 |
| 2011/0265188 | A1 * | 10/2011 | Ramaswamy | G06F 21/31 715/764 |
| 2012/0060207 | A1 * | 3/2012 | Mardikar | H04L 63/20 726/4 |

(Continued)

*Primary Examiner* — Ryan Barrett
(74) *Attorney, Agent, or Firm* — Leydig, Voit & Mayer, Ltd.

(57) ABSTRACT

A room communication kiosk integrated within a campus communication system. The room communication kiosk includes a touchscreen device. The touchscreen device is configured to: display one or more user function widgets on the touchscreen; sense one or more user touch gestures interacting with the one or more user function widgets displayed on the touchscreen; and generate a signal responsive to the one or more user touch gestures. The room communication kiosk is further configured to: receive the signal responsive to the one or more user touch gestures; interpret the signal responsive to the one or more user touch gestures based on the one or more user function widgets to determine a kiosk action for the campus communication system; and communicate the kiosk action to the campus communication system over the network interface.

15 Claims, 16 Drawing Sheets

(56) References Cited

U.S. PATENT DOCUMENTS

| | | | | |
|---|---|---|---|---|
| 2012/0159386 | A1* | 6/2012 | Kang | G06F 3/04883 715/800 |
| 2012/0179969 | A1* | 7/2012 | Lee | G06F 3/04817 715/765 |
| 2013/0081105 | A1* | 3/2013 | Giambiagi | H04L 63/20 726/1 |
| 2013/0268875 | A1* | 10/2013 | Han | G06F 3/04847 715/764 |
| 2014/0157166 | A1* | 6/2014 | Choi | G06F 3/04817 715/769 |
| 2014/0245198 | A1* | 8/2014 | Lee | G06F 3/04817 715/762 |
| 2015/0077326 | A1* | 3/2015 | Kramer | G06F 3/0346 345/156 |
| 2015/0210287 | A1* | 7/2015 | Penilla | B60N 2/0024 701/49 |
| 2016/0165369 | A1* | 6/2016 | Perkins | G08B 25/014 715/716 |
| 2016/0314476 | A1* | 10/2016 | Clurman | G06Q 30/0282 |
| 2017/0039823 | A1* | 2/2017 | Srivathsa | G06F 40/40 |
| 2017/0221344 | A1* | 8/2017 | Cox | G08B 25/10 |
| 2018/0004384 | A1* | 1/2018 | Fitzgerald | G06F 3/04817 |
| 2019/0362087 | A1* | 11/2019 | Ferrans | H04L 63/102 |
| 2020/0219217 | A1* | 7/2020 | Sudman | G06Q 50/205 |
| 2020/0221549 | A1* | 7/2020 | Sudman | G06F 3/0484 |
| 2022/0351722 | A1* | 11/2022 | Mandry | G10L 15/063 |

* cited by examiner

ROOM TOUCHSCREEN TERMINAL

FIELD OF THE DISCLOSURE

Embodiments of this disclosure generally relate to communication systems, and, in certain embodiments, to a communication system integration and operation.

BACKGROUND OF THE INVENTION

Communication systems facilitate communication of status and events within some defined area. For instance, one particular type of communication system is an intercom system within a school campus. The school intercom system communicates status and events within a school campus. For instance, a classroom within a school campus may need to communicate with a central office or various staff outside of the classroom. Typically, this room level communication may be achieved using a speaker/microphone within the room coupled with a call button to activate the call sequence with the school intercom system.

BRIEF SUMMARY OF THE INVENTION

One embodiment provides a room communication kiosk integrated within a campus communication system, the campus communication system providing integrated communication services for a plurality of rooms within a campus integrating the campus communication system, the room communication kiosk comprising: a housing configured for installation within a room of the plurality of rooms within the campus; a power interface configured to provide power to the room communication kiosk; a network interface configured to communicate with the campus communication system; a speaker configured to play audio signals from the campus communication system; a microphone configured to accept audio input from the room; a touchscreen device configured to: display one or more user function widgets on the touchscreen, wherein the one or more user function widgets displayed on the touchscreen are selected for inclusion on the touchscreen based on a location of the touchscreen device within the campus; sense one or more user touch gestures interacting with the one or more user function widgets displayed on the touchscreen; and generate a signal responsive to the one or more user touch gestures; and a processor configured to: receive the signal responsive to the one or more user touch gestures; interpret the signal responsive to the one or more user touch gestures based on the one or more user function widgets to determine a kiosk action for the campus communication system; and communicate the kiosk action to the campus communication system over the network interface.

Another embodiment includes a networked campus communication system, the system comprising: a district server configured to manage at least one communication system located within a campus managed by the district server; a district network configured to communicatively couple the at least one communication system and the district server; and a user interface configured to allow access to the district server to control the at least one communication system; wherein the at least one communication system comprises: a network switch configured to integrate communication equipment associated with the campus into the at least one communication system; a campus controller communicatively coupled to the network switch and configured to control the communication equipment associated with the campus; a room controller communicatively coupled to the campus controller and configured to control room communication equipment of a room within the campus; and a room communication kiosk, the room communication kiosk comprising: a housing configured for installation within a room of the plurality of rooms within the campus; a power interface configured to provide power to the room communication kiosk; a network interface configured to communicate with the at least one communication system; a speaker configured to play audio signals from the at least one communication system; a microphone configured to accept audio input from the room; a touchscreen device configured to: display one or more user function widgets on the touchscreen, wherein the one or more user function widgets displayed on the touchscreen are selected for inclusion on the touchscreen based on a location of the touchscreen device within the campus; sense one or more user touch gestures interacting with the one or more user function widgets displayed on the touchscreen; and generate a signal responsive to the one or more user touch gestures; and a processor configured to: receive the signal responsive to the one or more user touch gestures; interpret the signal responsive to the one or more user touch gestures based on the one or more user function widgets to determine a kiosk action for the at least one communication system; and communicate the kiosk action to the at least one communication system over the network interface.

In yet another embodiment, a campus communication system for a campus with a plurality of rooms, the system comprising: a campus controller configured for controlling communication equipment associated with the campus; and a room communication kiosk communicatively coupled to the campus controller through a network switch; wherein the room communication kiosk comprises: a housing configured for installation within a room of the plurality of rooms within the campus; a power interface configured to provide power to the room communication kiosk; a network interface configured to communicate with the campus communication system; a speaker configured to play audio signals from the campus communication system; a microphone configured to accept audio input from the room; a touchscreen device configured to: display one or more user function widgets on the touchscreen, wherein the one or more user function widgets displayed on the touchscreen are selected for inclusion on the touchscreen based on a location of the touchscreen device within the campus; sense one or more user touch gestures interacting with the one or more user function widgets displayed on the touchscreen; and generate a signal responsive to the one or more user touch gestures; and a processor configured to: receive the signal responsive to the one or more user touch gestures; interpret the signal responsive to the one or more user touch gestures based on the one or more user function widgets to determine a kiosk action for the campus communication system; and communicate the kiosk action to the campus communication system over the network interface.

BRIEF DESCRIPTION OF THE SEVERAL VIEWS OF THE DRAWING(S)

The accompanying drawings incorporated in and forming a part of the specification illustrate several aspects of the present invention and, together with the description, serve to explain the principles of the invention. In the drawings.

Figure 1:
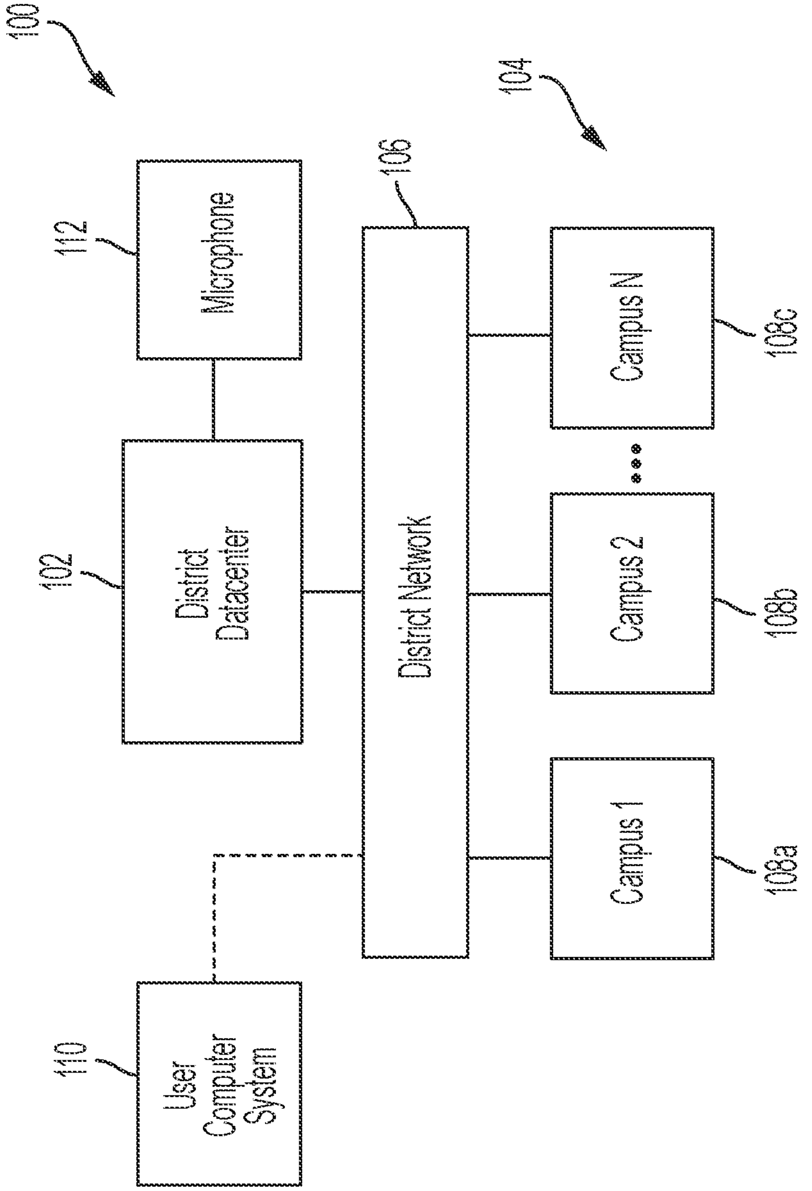
FIG. 1 is a block diagram of a district communication system integrating a plurality of campuses, according to an exemplary embodiment of the disclosure.

FIGS. 4-7 provide front views of a room communication kiosk, according to exemplary embodiments of the disclosure; and FIGS. 8-16 provide views of a user interface of the room communication kiosk, according to exemplary embodiments of the disclosure.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE INVENTION

Embodiments of the disclosure described below are directed to communication systems that facilitate quick and efficient communication of status, events and information to relevant personnel with respect to activities happening within a particular structure or structures that contain the communication system. For instance, embodiments of the disclosure describe communication systems with critical functionality such as providing emergency alerts and status to first responders and other such individuals during an emergency situation.

The embodiments of the communication system described below are directed to improvements on a traditional intercom system typically found within a school environment. However, the communication system that is the subject of the disclosure contained herein is not intended to be limited to use within a school environment. Indeed, embodiments of the communication system, including the room communication kiosk, may be utilized in any environment that includes rooms, spaces and/or hallways, such as found in office buildings or other similar structures. As such, the disclosure describing the functionality of the communication system and room communication kiosk described below are not limited strictly to the school environment. Rather, the description is provided in relation to the school environment for ease of description, and could be extrapolated to other environments, as would be understood by one of skill in the art in view of the disclosure contained herein.

For instance, embodiments of the communication system described below within a school include use of one or more room communication kiosks. These room communication kiosks are generally associated with individual rooms, areas, hallways and zones within the school to provide interactive audio/visual communication and certain functionality to certain personnel. In addition, these room communication kiosks can be operated in a variety of ways based on a user of the room communication kiosk and further based on a location of the room communication kiosk. The described functions and operation of the room communication kiosks below can be adapted to other environments outside of the school environment. Indeed, similar operation of the room communication kiosks could function within environments such as an office building or park, or any structure or collection of structures with rooms, hallways and/or other spaces.

With respect to the school environment, individual schools may be arranged into school districts based on a geographic proximity between each school. Further, each school may include communication equipment that allows for communication of a school schedule and for communication between locations within the school and the district. This communication equipment generally includes devices such as bells and classroom speakers for direct communication between a classroom and a front office of the school.

FIG. 1 illustrates a district wide interconnected and centrally administered school district communication system 100. As illustrated in FIG. 1, a plurality of school campuses 104, each with an individual school communication system, are organized into the school district communication system 100. As illustrated, the plurality of school campuses 104 are interconnected through a district network 106, which in turn interfaces the plurality of school campuses 104 with a district datacenter 102. The district datacenter 102 includes a server or servers each with an associated processor or processors running a networked application controlling a communication system within each of the plurality of school campuses 104. The networked application provides school district administrators with the ability to control all communication among the plurality of school campuses 104. This control is provided through a user interface, which allows control over bell schedules, announcements and other calendar management tools along with enabling emergency notifications for lockdown, lock out and evacuation events. School administrators access this user interface via a user computer system 110, which is communicatively coupled to the district network 106.

In a particular embodiment, the user interface may be a web-based user interface, and the user computer system 110 can be any computer system that is capable of communicating with the district network 106 over the web-based user interface. For instance, the computer system 110 may take a variety forms such as a mobile device, tablet device, laptop computer or any device capable of communicating with the web-based user interface.

Further, access to the web-based user interface from the user computer system 110 is granted based on an administrator's or user's login credentials. Any time a user accesses the web-based user interface, login credentials will be required before any functionality is provided. The login credentials not only provide access to the web-based user interface, but they also provide a level of access to the communication systems at the plurality of school campuses 104. For instance, in certain embodiments, the plurality of school campuses 104 may include individual school campuses 1-N, 108*a*, 108*b* and 108*c*, and the individual user may only be authorized to control the communication system at a single campus such as school campus 1 108*a*. Therefore, upon entering the user login credentials, the district datacenter 102 administrating the web-based user interface will look up the user's level of access and provide control only according to that access via the web-based user interface.

In certain embodiments, the district datacenter 102 further includes an integrated computer terminal that hosts a microphone 112. The microphone 112 is configured to allow a user to provide audio to the microphone 112, which can be streamed to any communication system at any campus 108*a*, 108*b* or 108*c* within the district. As an aside, each individual school communication system (see FIG. 2) can also include an integrated computer terminal that hosts a microphone client into which a microphone can be integrated such that an audio signal from the microphone can be broadcast over the individual school communication system.

Figure 2:
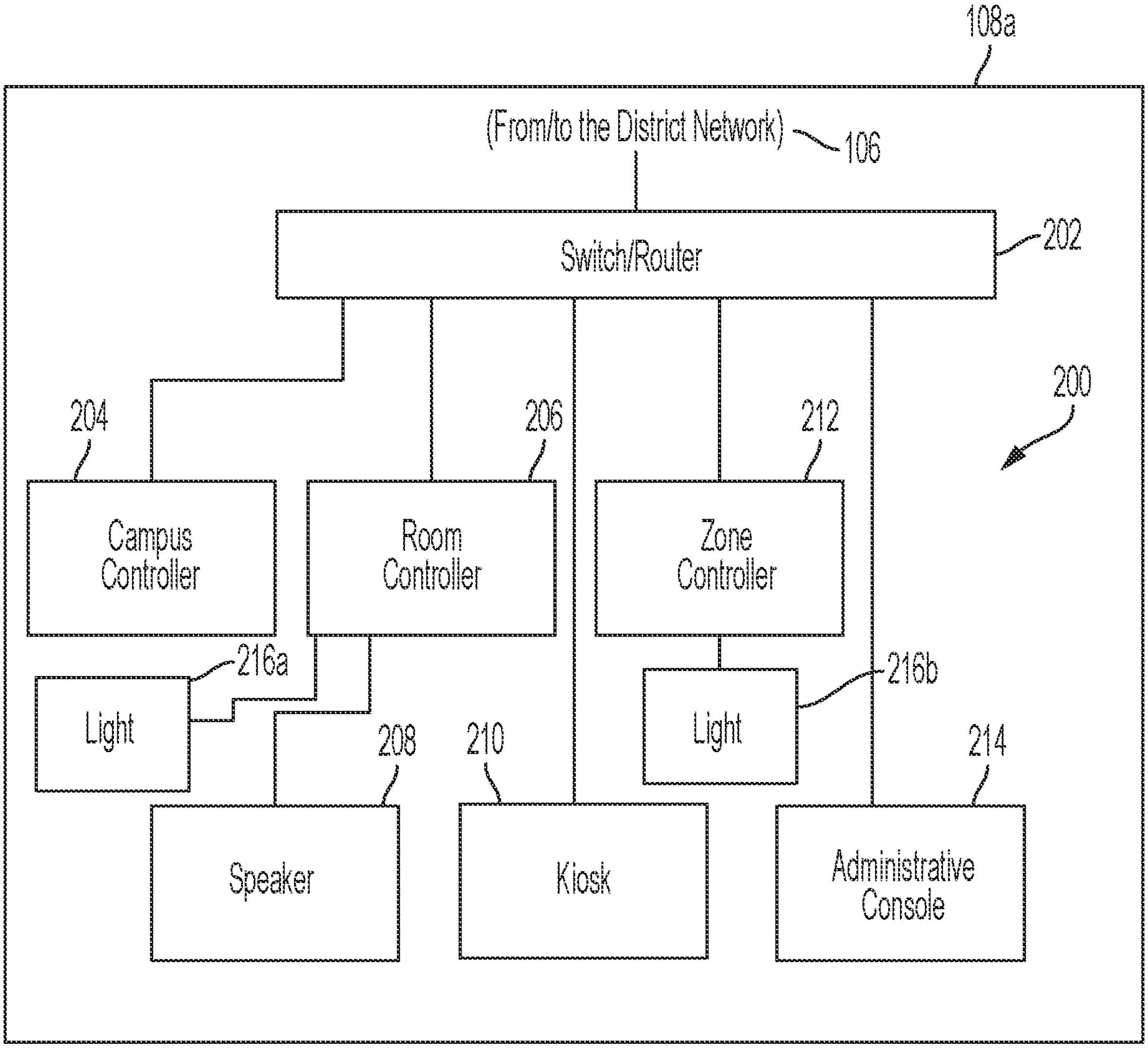
FIG. 2 is a block diagram of a campus communication system, according to an exemplary embodiment of the disclosure.

FIG. 2 illustrates the components of the school communication system 200 for individual school campus 108*a* (individual school campuses 108*b* and 108*c* may include school communication systems similar to school communication system 200). The school communication system 200 includes a switch/router 202, which provides a shared network connection for the various components of the school communication system 200 to the district network 106 (see FIG. 1). The various components of the school communication system 200 are distributed throughout a plurality of zones, which define physical spaces within the school campus 108*a*. In this regard, each zone has zone specific communication equipment associated with the district location/school campus 108*a*.

Components of the school communication system 200 include a campus controller 204, a room or classroom controller 206, a room communication kiosk 210, a zone controller 212, an administrative console 214 and status indicator lights 216*a* and 216*b*. The campus controller 204 is an embedded interface for all of the campus devices located at the campus 108*a* to the district datacenter 102 (see FIG. 1). In this regard, the campus controller 204 functions to provide the interface for the classroom controller 206, the room communication kiosk 210, the zone controller 212, and the administrative console 214 to the district datacenter 102. The campus controller 204 functions as a Session Initiation Protocol (SIP) Gateway, including processors and memory devices that enable the campus controller 204 to provide communication to/with various communication equipment, or, in other words, the campus communication equipment, including the classroom controller 206, the room communication kiosk 210, the zone controller 212 and the administrative console 214. In this regard, the campus controller 204 functions to provide full paging, pre-recorded audio, live audio, intercom audio, and other control signals to any single campus device or combination of campus devices located within any number of zones throughout the campus 108*a*. Typically, the campus controller 204 interprets instructions received from the district datacenter 102 (see FIG. 1) by parsing those instructions to determine embedded communication events. The campus controller then optionally stores/archives those instructions with an associated memory (not illustrated) and transmits the instructions in the form of a control signal to various campus devices.

The school communication system 200 further includes the classroom controller 206 associated with each classroom of the school at campus 108*a*. In certain embodiments, each classroom can be considered a separate zone within the campus 108*a*. The classroom controller 206 communicates via IP-based signals and interfaces with the campus controller 204 through the switch/router 202 such that it sends/receives data to/from the campus controller 204. In this manner, the classroom controller 206 functions as an IP room module. The classroom controller 206 interfaces with a speaker 208 and an in-room strobe or alert light (not illustrated. In certain embodiments, the speaker 208 interfaces with the classroom controller 206 through a bi-directional amplifier (not illustrated) which allows for the speaker module 208 to function as both a speaker and a microphone for the classroom controller 206.

Alternatively, the room communication kiosk 210 includes a power over Ethernet data/power connection to the switch/router 202 and further includes an integrated speaker and microphone capable of replacing the speaker 208 in certain instances of operation. In certain embodiments, audio communication will be between the speaker/microphone of the room communication kiosk 210 and the administrative console 214 or an external phone system and is controlled by the campus controller 204. The room communication kiosk 210 allows for personnel within the classroom to call into the administrative console 214 or perform a check-in during an emergency situation.

The classroom controller 206 can also trigger a visual indicator such as an in room strobe light or alert light upon receiving a command to do so from the campus controller 204. The classroom controller 206 can further trigger a visual indicator external to the classroom from the status indicator light 216*a* upon receiving a command to do so from the campus controller 204.

School communication system 200 further includes the zone controller 212, which functions in a similar manner to the classroom controller 206. Typically, a school will include a plurality of zones, other than classrooms, which comprise various locations throughout the school and campus in general. Typically, each non-classroom zone within the school will include at least one zone controller 212. The zone controller 212 decodes IP-based signals from the campus controller 204 into signals for controlling a status light indicator 216*b*. The zone controller 212 communicates these control signals to the status indicator light 216*b* over a digital interface.

The school communication system 200 further includes the administrative console 214, which, in certain embodiments, provides a single point of access to the school communication system 200. In this regard, the administrative console 214 is equipped with various interfaces, speakers and microphones for communication within the school communication system 200. The administrative console 214 can initiate classroom intercom discussion over the room communication kiosk 210, perform zone or system-wide pages and receive visual alerts from classroom communications over a display associated with the administrative console 214. In certain embodiments, the administrative console 214 can also perform pre-programmed sequences for the school communication system 200, such as initiating an emergency sequence.

As mentioned above, the administrative console 214 includes an associated display. In certain embodiments, during an emergency event, the display can be configured to function as a centralized emergency console or in other words an emergency display console that can display check-in information for each zone or classroom within the school campus 108*a* (see FIG. 1). Check-in information indicates that a classroom has checked in by interacting with room communication kiosk 210 (discussed further below) during the emergency event and thereby indicates that the particular classroom associated with that room communication kiosk 210 is not in an immediate emergency. In this regard, first responders to an emergency situation will have a single point showing immediate status of the various classrooms and zones within the school campus 108*a*. As an aside, the administrative console 214 is not required to also be the centralized emergency console as well. A separate device similar to the administrative console 214 could be utilized as a dedicated device to function as an emergency console only during emergency events.

Figure 3:
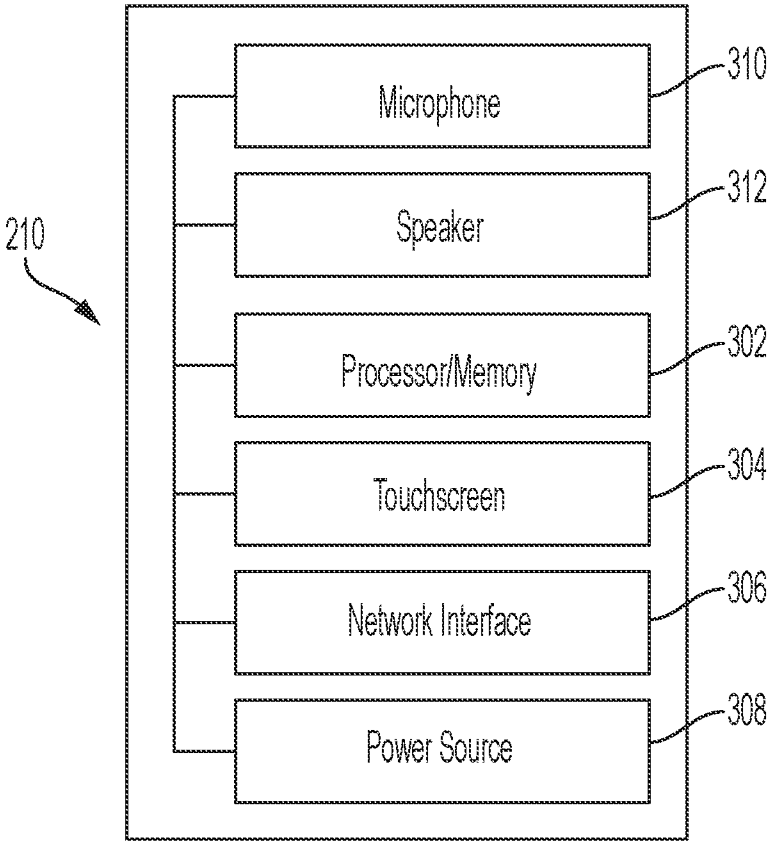
FIG. 3 is a block diagram of a room communication kiosk, according to an exemplary embodiment of the disclosure.

FIG. 3 illustrates a block diagram of the room communication kiosk 210. As illustrated, the room communication kiosk 210 includes a processor and associated memory 302, a touchscreen 304, a network interface 306, a power source 308, a microphone 310, and a speaker 312. The processor and associated memory 302, the touchscreen 304, the network interface 306, the power source 308, the microphone 310, and the speaker 312 are configured to be controlled by an operating system of the room communication kiosk 210 to provide interactive control and functionality via a user interface displayed on the touchscreen 304 to a user of the room communication kiosk 210. The operating system provides widgets executed at the room communication kiosk 210 to provide the interactive control and functionality. The widgets are accessible via user selectable icons displayed on the touchscreen 304. By accessing the widgets, a user is able to interact with the room communication kiosk 210 to perform system functionality and communication, as further discussed in relation to FIGS. 4-16 below.

In certain embodiments, the operating system is stored in memory and executed by a processor local to the room communication kiosk 210. While in other embodiments, the operating system is executed remotely at the server level, such as at the campus controller 204 or at the district datacenter 102, and the room communication kiosk 210 is a client device for interfacing with the hosted operating system.

In typical school intercom systems, interaction with a classroom from the outside is typically performed by communication over a speaker/microphone such as speaker 208 (see FIG. 2). Accordingly, communication with the room utilizing the speaker 208 is limited to simple audio communication. More interactive communication and functionality is not capable over the standard audio with speaker 208. In order to implement a more feature rich user experience for interaction and control of the classroom, the room communication kiosk 210 is provided. The room communication kiosk 210 includes both the speaker 312 and microphone 310 and is integrated with the switch/router 202 such that communication typically performed via speaker 208 can alternatively be performed with the speaker 312 and microphone 310 via controls implemented in the user interface on the touchscreen 304. In addition, a whole host of other functionality may be implemented at the room communication kiosk 210 as will be described with respect to FIGS. 4-16. Additionally, the operating system of room communication kiosk 210 may be configured to be adapted to provide expandable functionality as new system updates are provided. Accordingly, the room communication kiosk 210 presents a feature rich and experience expandable room communication and control solution.

The processor and associated memory 302 may include one or more types of processors such as microprocessor, microcontroller, embedded processor, or digital signal processor, or similar such device. Further, the memory may be one or more of a read only memory (ROM) and a random access memory (RAM). In some embodiments, the ROM stores basic input/output system (BIOS), which contains basic routines that assist in information exchange between different units within the room communication kiosk 210. The RAM is working memory and may store a variety of items including parts of the operating system, and programs and data necessary for correct operation of the operating system.

The room communication kiosk 210 further includes the touchscreen 304, which is configured to accept user touch input. Specifically, the touchscreen 304 senses a user's touch gestures on the surface of the touchscreen 304 and generates a signal responsive to the touch gesture. The signal is provided to the processor and associated memory 302 for interpretation of a user command based on the gesture and state of the operating system of the room communication kiosk 210. In this manner, the user is able to interact with the room communication kiosk 210 and the school communication system 200 in general.

The room communication kiosk 210 is communicatively coupled with the school communication system 200 via the network interface 306. Network interface 306 may be a wired or wireless network interface, supporting several wireless technologies including Bluetooth®, Wi Fi, ultra-wide band (UWB), wireless USB, ZigBee, WiMAX, long term evolution (LTE), etc.

Further, the room communication kiosk 210 receives power for operation from the power source 308. In certain embodiments, the power source 308 may provide power to the room communication kiosk 210 either via connection to a wired power system of the campus 108*a* (see FIGS. 1 and 2) or via a battery. In other embodiments, the network interface 306 and the power source 308 may be made via a common interface. For example, the network interface 306 and the power source 308 may be formed by a Power over Ethernet (POE) connection to the room communication kiosk 210.

Figure 4:
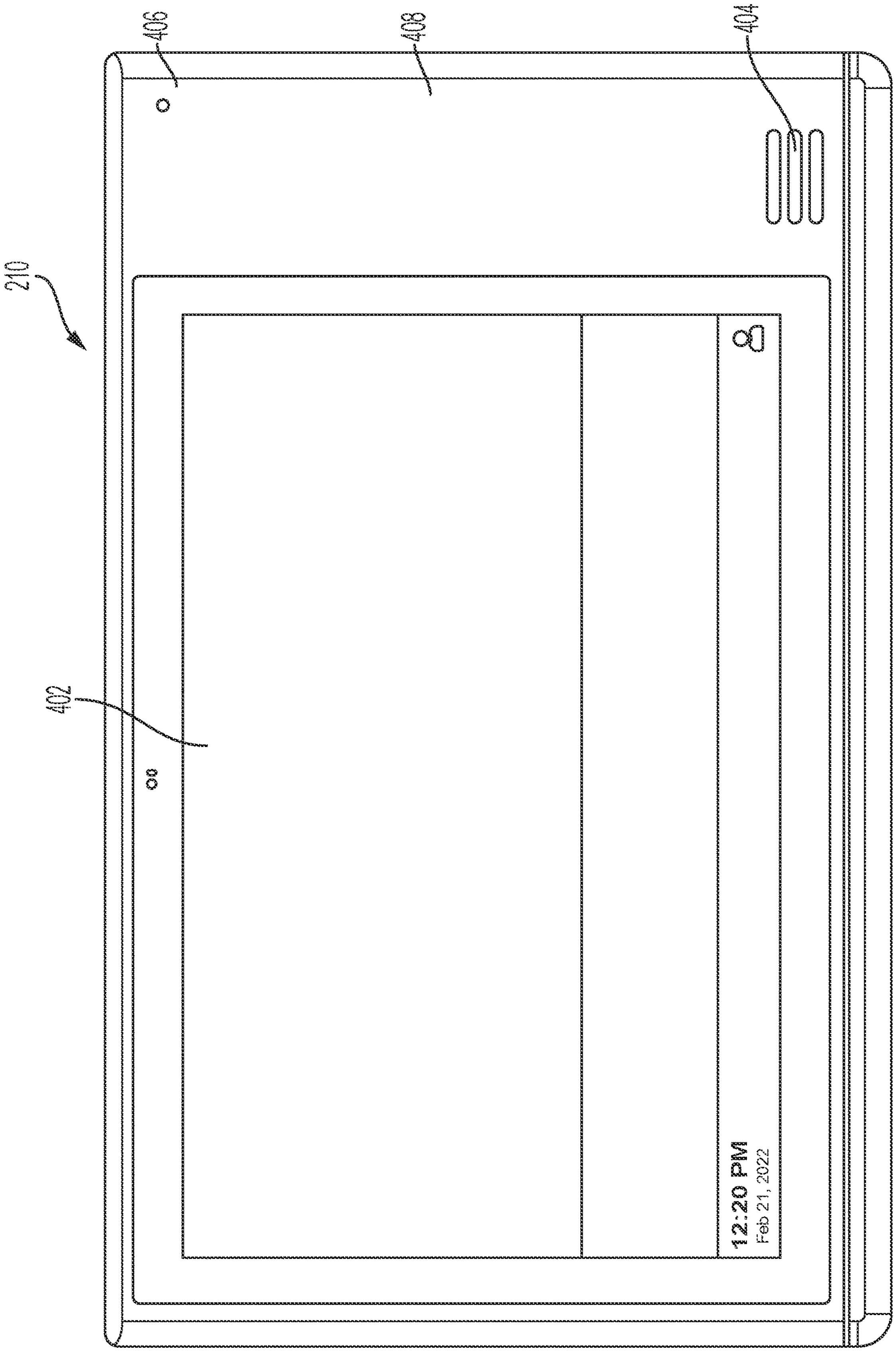

FIG. 4 illustrates a frontal view of the room communication kiosk 210. In the illustrated embodiment, the room communication kiosk 210 includes a touchscreen 402, a speaker 404, and a microphone 406 all contained in a housing 408. The touchscreen 402 functions as both a display for the room communication kiosk 210 and as an input device for the room communication kiosk 210. The speaker 404 and the microphone 406 allow for audio communication with a remove device communicatively coupled to the room communication kiosk 210. The housing 408 packages the touchscreen 402, the speaker 404, and the microphone 406 into a single device and provides structure for the room communication kiosk 210 to be installed within a classroom of the campus 108*a* (see FIG. 1). In certain embodiments, the room communication kiosk 210 is configured as an endpoint device where the primary speaker/microphone combination remains as the speaker 208 (see FIG. 2). However, in other embodiments, the room communication kiosk 210 operates as a standalone device where the user utilizes the speaker 404 and the microphone 406 for communication.

Figure 5:
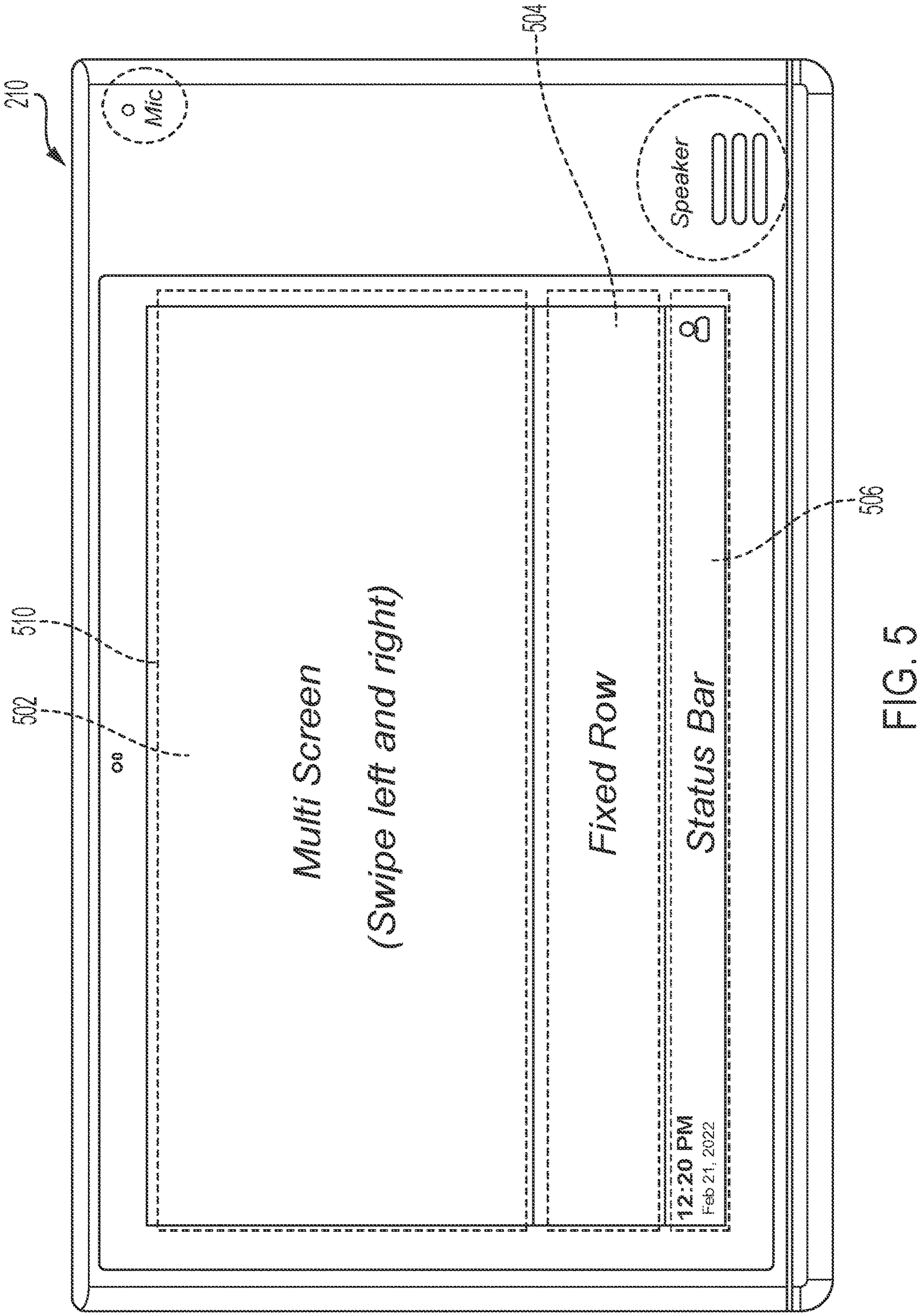

FIG. 5 illustrates an organization structure of regions of the touchscreen 510. As shown, the touchscreen is organized into three primary sections, a multi-screen section 502, a fixed row 504, and a status bar 506. The multi-screen section 502 allows a user to cycle through a series of different screen embodiments displaying various arrangements of widgets for the user to interact with during operation. These screens are accessible via left or right user gesture swipes on the touchscreen 510. The fixed row 504 occupies the section of the touchscreen 510 beneath the multi-screen section 502. The fixed row 504 also displays widgets, but the widgets displayed on the fixed row do not change when a user cycles through one or more screens of the multi-screen section 502. Typically, the most commonly used widgets are placed in the fixed row 504. Below the fixed row 504, is the status bar 506. The status bar 506 is always visible on the room communication kiosk 210 and provides information to the user. In certain embodiments, the information includes a time and date, status bar feedback on current events at the room communication kiosk 210, and a profile accessibility icon.

Figure 6:
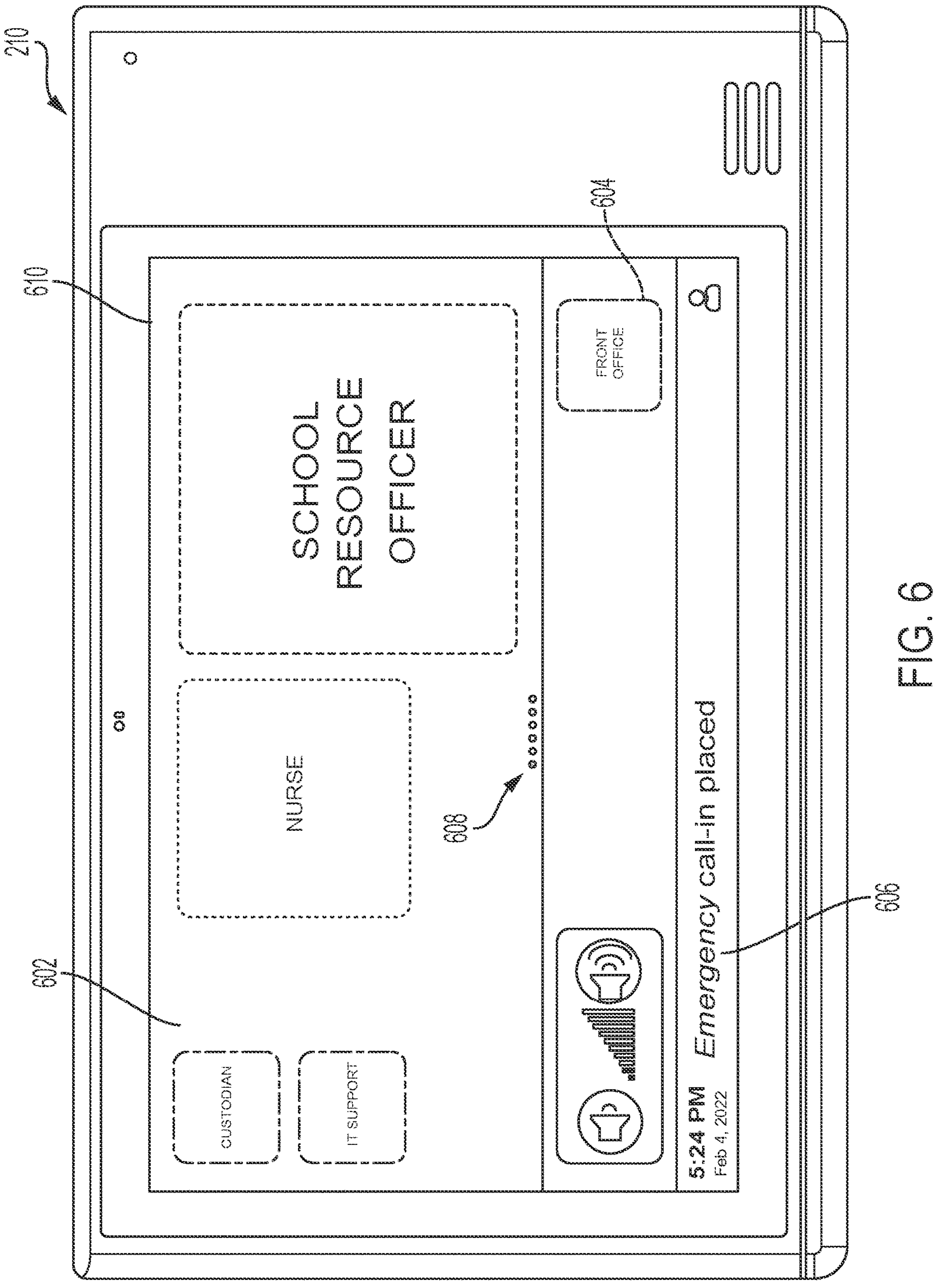

FIG. 6 illustrates a particular embodiment showing a particular touchscreen 610 layout of the room communication kiosk 210. As shown, the room communication kiosk 210 includes multi-screen section 602 including widgets for calling a custodian, IT Support, a Nurse, and a School Resource Officer. The multi-screen section 602 further displays indicator dots 608 that show a number and relative positions of the various selectable screens of the multi-screen section 602. An individual indicator dot of the indicator dots 608 represents a single screen view, with the current screen view being highlighted within the collection of indicator dots 608. The fixed section 604 illustrates a volume control widget and a Front Office call in widget. These widgets remain in the fixed section 604 regardless of the selected view from the multi-screen section 602. The status bar 606 illustrates the date and time on the left of the status bar 606, a room communication kiosk 210 status of being in an "Emergency call-in placed" state in the middle of the status bar 606, and a user profile icon on the right side of the status bar 606.

The widget type and layout of the multi-screen section 602 and the fixed section 604 are configurable based on location of the room communication kiosk 210 and the user profile currently opened at the room communication kiosk 210. When a particular user has a profile created with the room communication kiosk 210, a touchscreen 610 layout may be created so to customize widgets based on user access level provided to the user based on the profile configuration. In certain embodiments, the room communication kiosk 210 may be provided with three access level profiles, including a public profile, a standard profile, and an override profile. The public profile is a general access profile that any user interfacing with the room communication kiosk 210. The standard profile provides separate functionality from the public profile and can only be accessed by a user with access rights granted allowing use of the standard profile. The override profile provides separate functionality from the public and standard profiles and can only be accessed by a user with access rights granted allowing use of the override profile. Further, each of the public, standard, and override profiles may be different based on a location of the room communication kiosk 210 within the campus 108*a* (see FIG. 1). As an aside, while only three profile levels are discussed here, more or less than three levels of profiles are contemplated.

Figure 7:
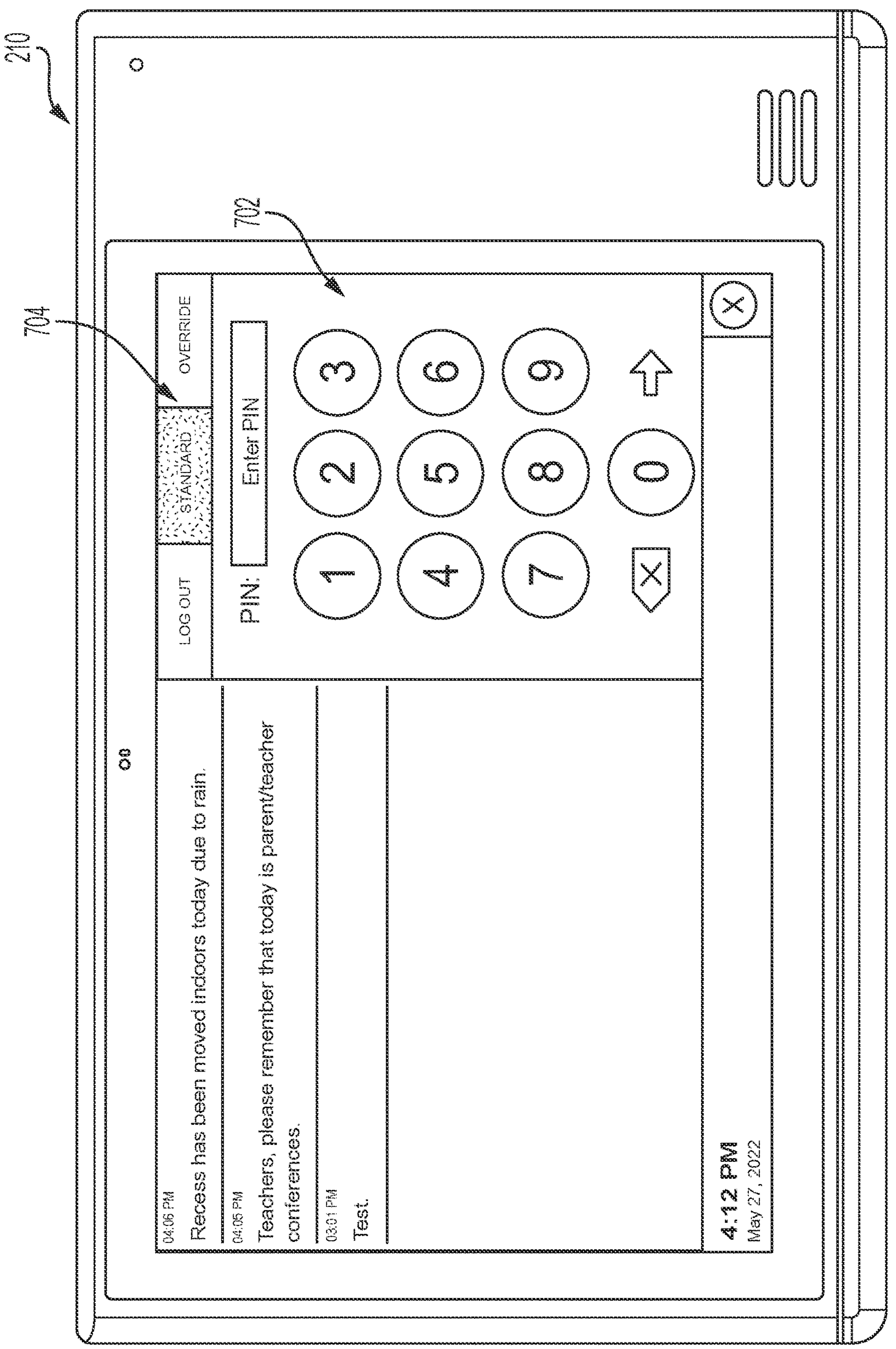

FIG. 7 illustrates a room communication kiosk 210 in a state for entering a Personal Identification Number (PIN). An authorized user of the room communication kiosk 210 sets up a PIN when registered to use the room communication kiosk 210. By entering the PIN, the room communication kiosk 210 is configured according to the user's granted profile level set up when registering to use the room communication kiosk 210. Further, others that do not have a user's PIN are then unable to access the room communication kiosk 210 using the standard or override profile but may be able to access the room communication kiosk 210 at the public profile level, which provides a certain level of functionality based on the location of the room communication kiosk 210.

In certain embodiments, the user profiles may be one of multiple different types of profile. In a particular embodiment, and as discussed above, there are three user profiles, including public profiles, standard profiles, and override profiles. Public profiles are general use profiles where preset widgets and other use features of the room communication kiosk 210 are provided to users that do not have a PIN. Similar to other profiles, general use profiles may be different based on a location of the room communication kiosk 210 within the campus 108*a* (see FIG. 1) When a user has a PIN, based on their profile, they can enter their PIN for either a standard or override profile 704. When the profile is a standard profile, upon entering the PIN, the associated functionality and arrangement of views and widgets on the room communication kiosk 210 based on its location within the campus 108*a* will be set up for use. When the profile is an override profile, upon entering the PIN, the associated functionality and arrangement of view and widgets on the room communication kiosk 210 will be set up for use, similar to the standard profile. However, the override profile includes further functionality at the system administrator level. Again, this functionality may change based on a location of the room communication kiosk 210 within the campus 108*a*.

Widgets provided on the room communication kiosk 210 are interactive virtual tools that provide single-purpose services enabling a user to control the room communication kiosk 210 from the classroom containing the room communication kiosk 210. In certain embodiments, widgets can be classified in three types: Workflow, Information, and Local Control. Workflow widgets help automate room communication kiosk 210 functionality. These include call-in, emergency initiation, and room attributes widgets. Information widgets help provide information to the kiosk user. These include emergency response and today's schedules widgets, as well as room communication kiosk 210 messages. Local Controls widgets help the kiosk user modify and control room communication kiosk 210 functionality for the room containing the room communication kiosk 210. These include functionality such as screen clean, brightness, volume control, room audio exclusions, program distribution, and timer/stopwatch widgets.

Figure 8:
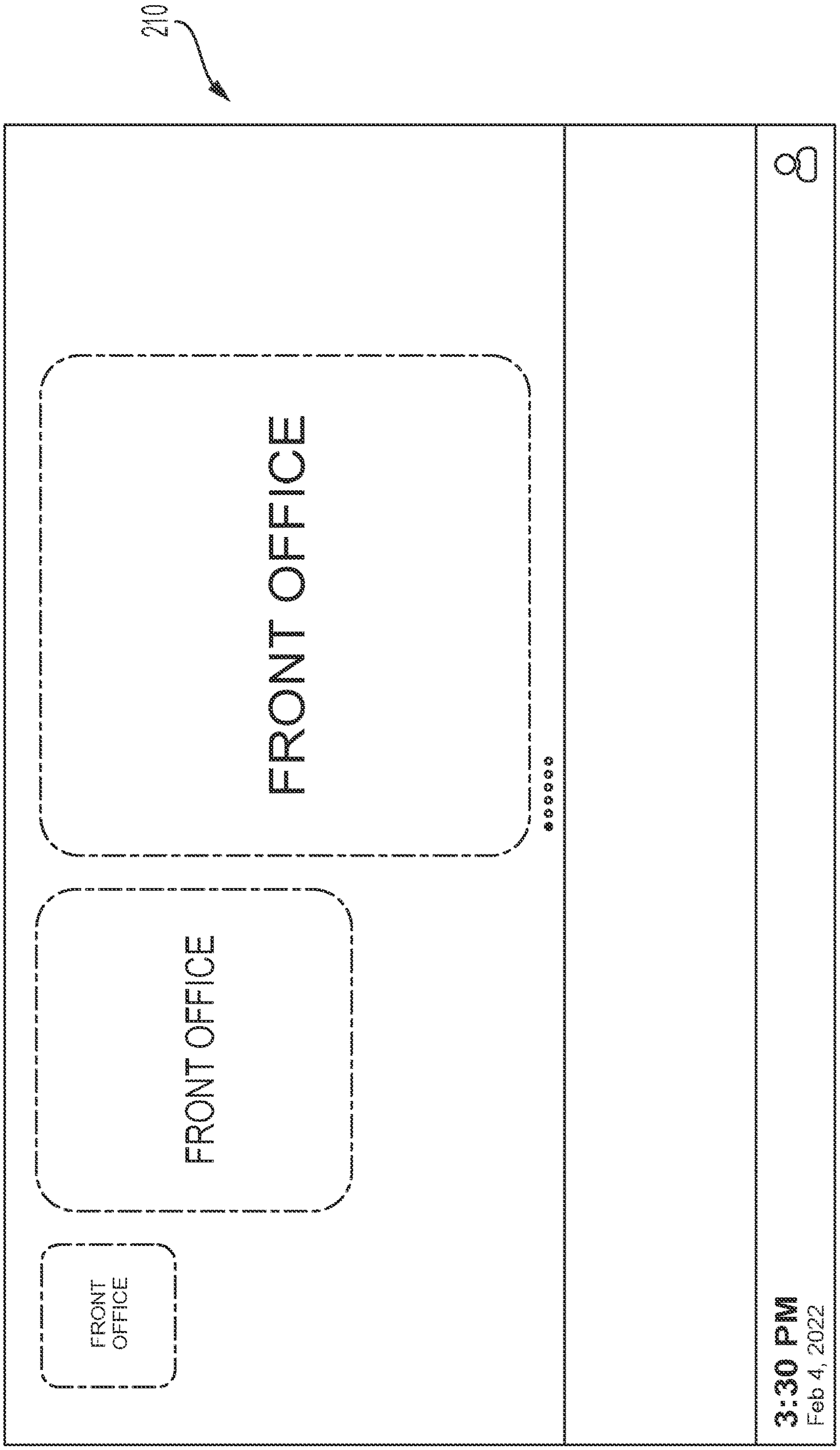

The different types of widgets (i.e., Workflow, Information, and Local Controls) have different optional sizing for each category and type of widget. For instance, with respect to workflow widgets, the Call-In Widget allows a room communication kiosk 210 user to initiate a call-in to administrative consoles or SIP phones and activate workflow automation. Call-in widgets can be configured in three sizes: 1×1, 2×2, or 3×3. The priority of a call-in widget corresponds to the configured Call-In Priority assigned to it during configuration of the room communication kiosk 210. The display name of the call-in widget can be modified on a configuration screen of the room communication kiosk 210. In a particular embodiment, when a call-in is inactive (not pressed), its display color is shown as a border around the widget. Once activated (pressed), the entire call-in widget will illuminate with its corresponding color. The call-in will remain active (and illuminated) until a console or SIP phone user answers the call-in, or if the call-in is cancelled. FIG. 8 illustrates an exemplary embodiment of a user interface of the room communication kiosk 210 showing three different size options for a "Front Office" call-in widget.

Figure 9:
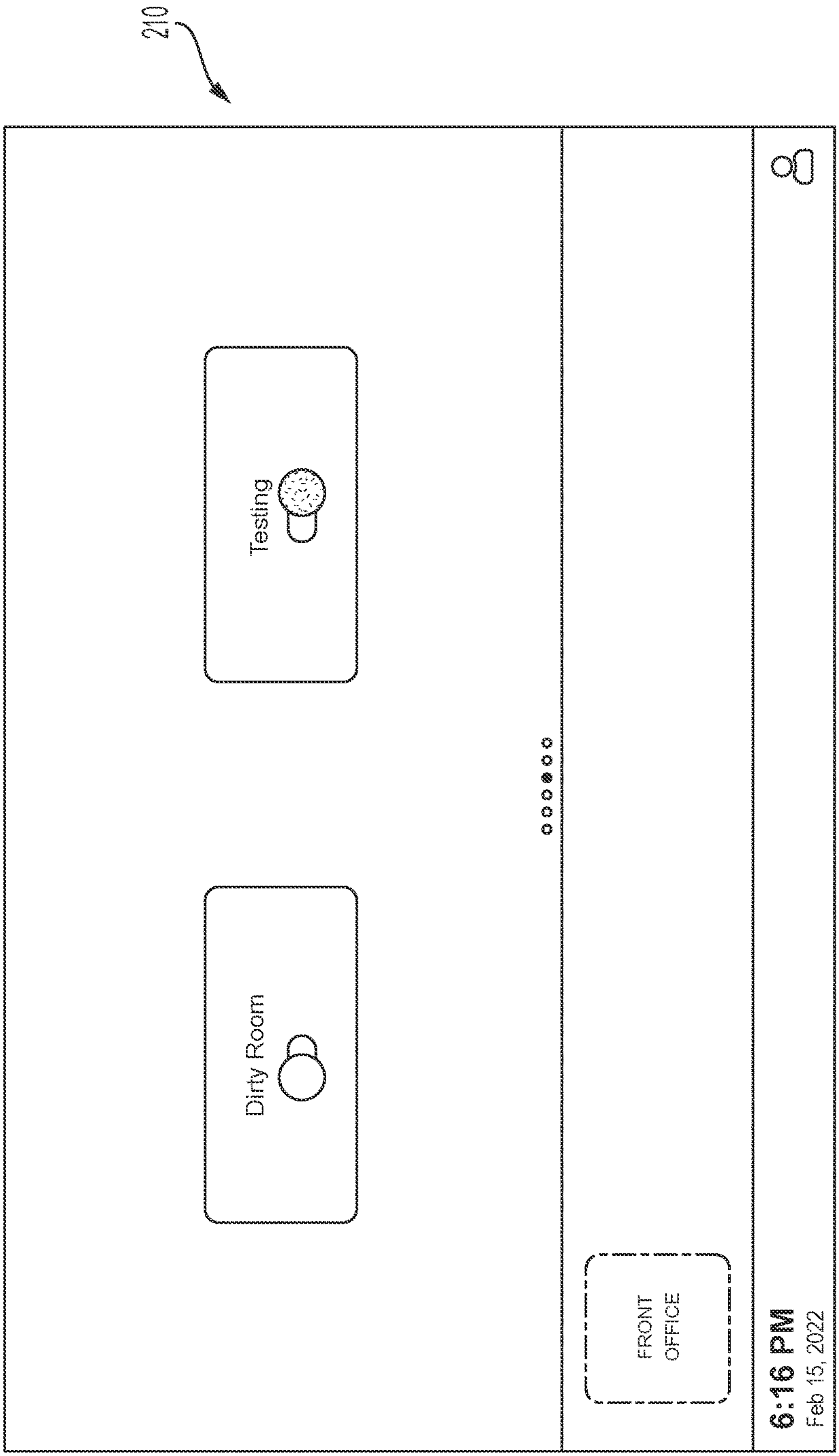

Continuing with workflow widgets, the Room Attributes Widget allows a room communication kiosk 210 user to set and clear room attributes for its corresponding location. This widget can be toggled in two positions: either on or off. Setting a room attribute from the Room Attributes Widget can trigger a status light, map, and be shown in an event history report of the room communication kiosk 210. FIG. 9 illustrates a user interface showing exemplary room attributes widgets for a "Dirty Room" and "Testing." When the "Dirty Room" widget is activated, a call-in is placed to janitorial services for the campus 108*a* (see FIG. 1) to clean the room with the room communication kiosk 210. When the "Testing" room attribute widget is toggled, it indicates that testing is occurring in the room with the room communication kiosk 210.

Figure 10:
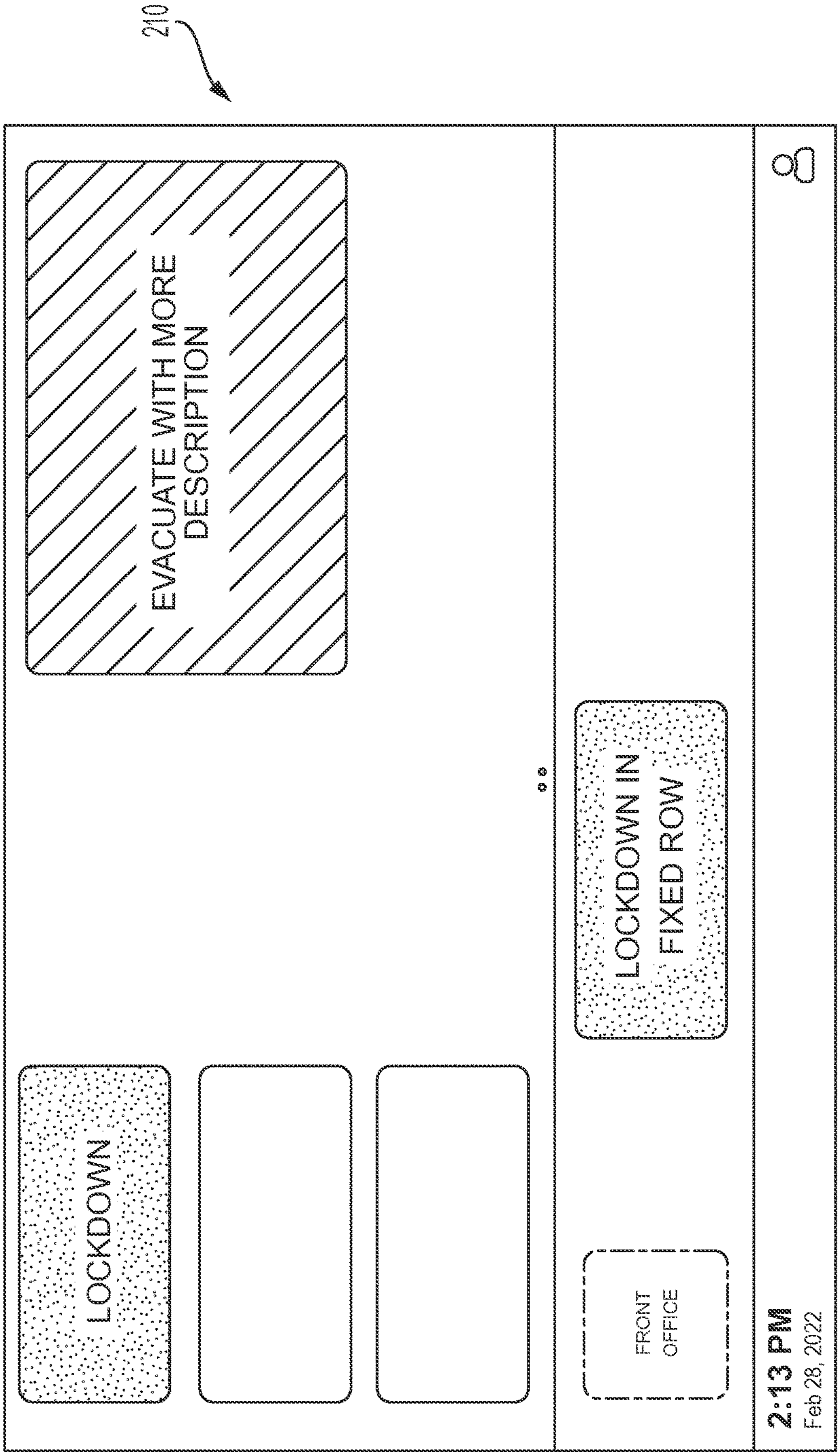

Further to workflow widgets, Emergency Initiation widgets allow a room communication kiosk 210 user to initiate/start a configured communication system 200 (see FIG. 2) emergency sequence. In certain embodiments, the emergency initiation widget can be configured in two sizes: 2×1 or 3×2. Further, in certain embodiments, the color of the Emergency Initiation widget can be configured in the room communication kiosk 210 configuration screen. The display name and color of the emergency initiation widget can also be modified on the room communication kiosk 210 configuration screen. Each widget is configured to initiate the specific emergency assigned to that widget. FIG. 10 provides an exemplary implementation of a view of a user interface of the room communication kiosk 210 including Emergency Initiation widgets. As illustrated, FIG. 10 shows a widget for evacuation, where further details of why an evacuation is being initiated by selecting one of "Lockdown," "Weather," or "Drill Lockout." Further, the fixed row section of the room communication kiosk 210 provides a "Front Office" call-in widget and "Lockdown" initiation widget.

In certain embodiments, Information widgets generally include Emergency Response and Schedule widgets. The Emergency Response widget is an automatic instruction notification that displays emergency information on the room communication kiosk 210 touchscreen. The Emergency Response widget appears automatically during an active emergency. This widget will appear on the touchscreen whether the room communication kiosk 210 is in a screensaver mode or not. In certain embodiments, a user may swipe away from the emergency response widget to access other features, but the room communication kiosk 210 will automatically snap back to the emergency response widget after 30 seconds.

Figure 11:
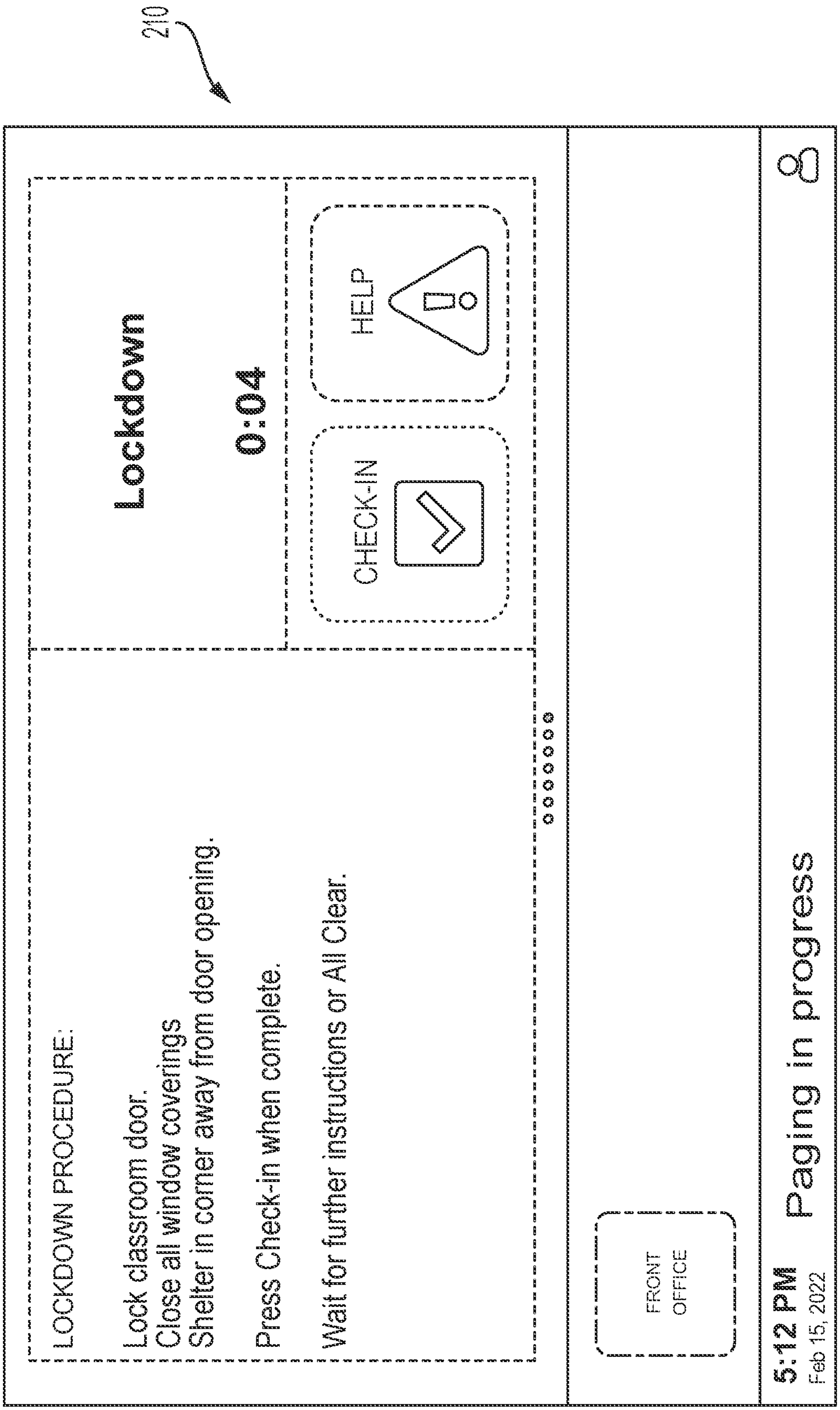
Figure 12:
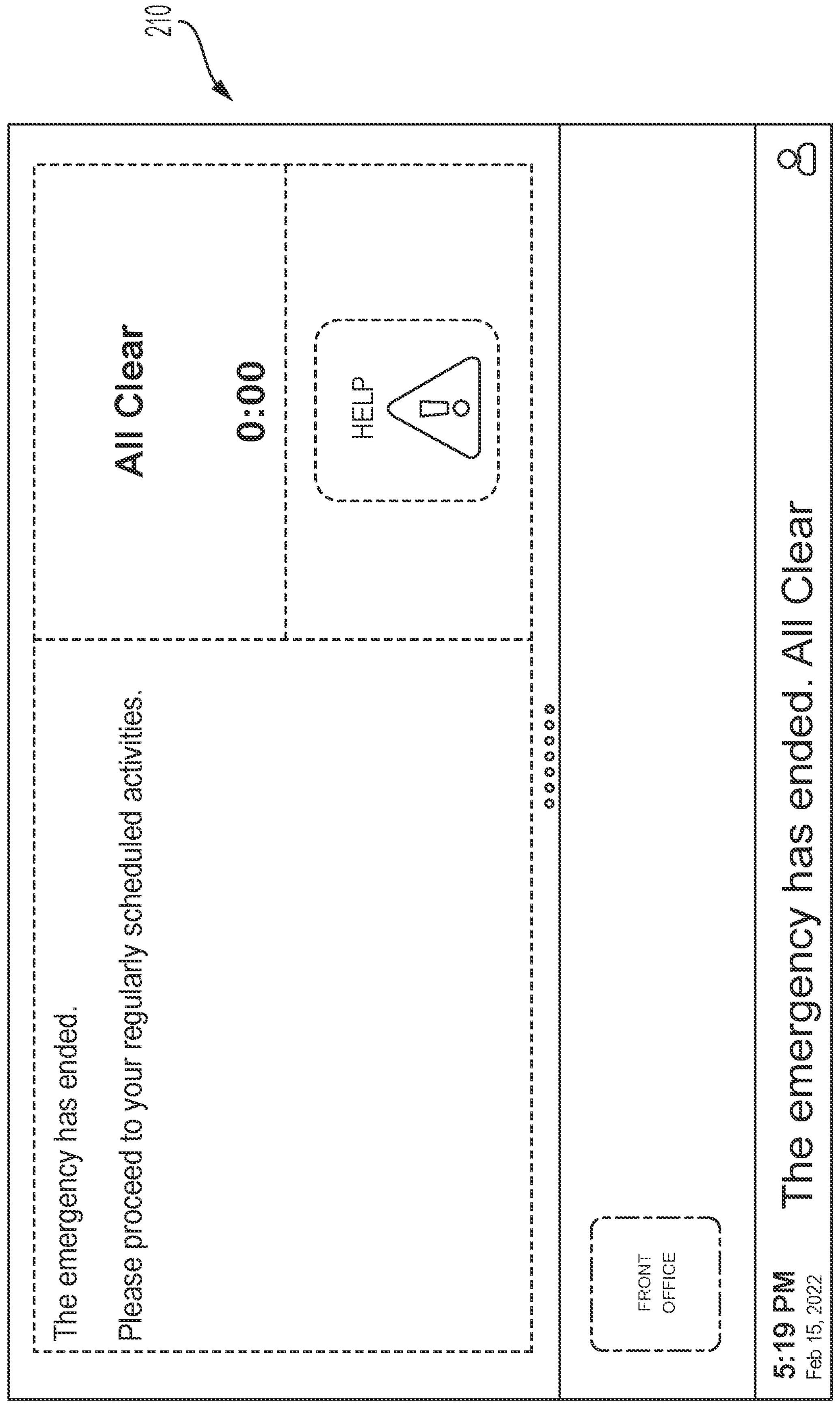

FIGS. 11 and 12 illustrates a particular embodiment of a user interface showing the Emergency Response informational widget on the room communication kiosk 210. The Emergency Response widget displays status information about the emergency and configurable instructions about how to respond to the emergency. If an emergency is configured to support check-in, the emergency response widget will display a "check-in" button. Otherwise, no check-in is shown on the widget. Additionally, a "help" button may be available on the Emergency Response informational widget so that a user can reach the front office or other administrative console 214 (see FIG. 2). FIG. 11 illustrates the "Lockdown" status, and FIG. 12 illustrates an "All Clear" status.

In certain embodiments, when an emergency is initiated within the campus, the emergency is automatically initiated to all room communication kiosks 210 within the campus 108*a* (see FIG. 1). Further, while the emergency is initiated at all room communication kiosks 210, each message and functionality displayed on each room communication kiosk 210 may be different based on a location of the individual room communication kiosk 210. Additionally, during an emergency, when a call in is placed from a specific room communication kiosk 210, a location of the room communication kiosk 210 is known to the school communication system 200 and/or the district communication system 100.

Figure 13:
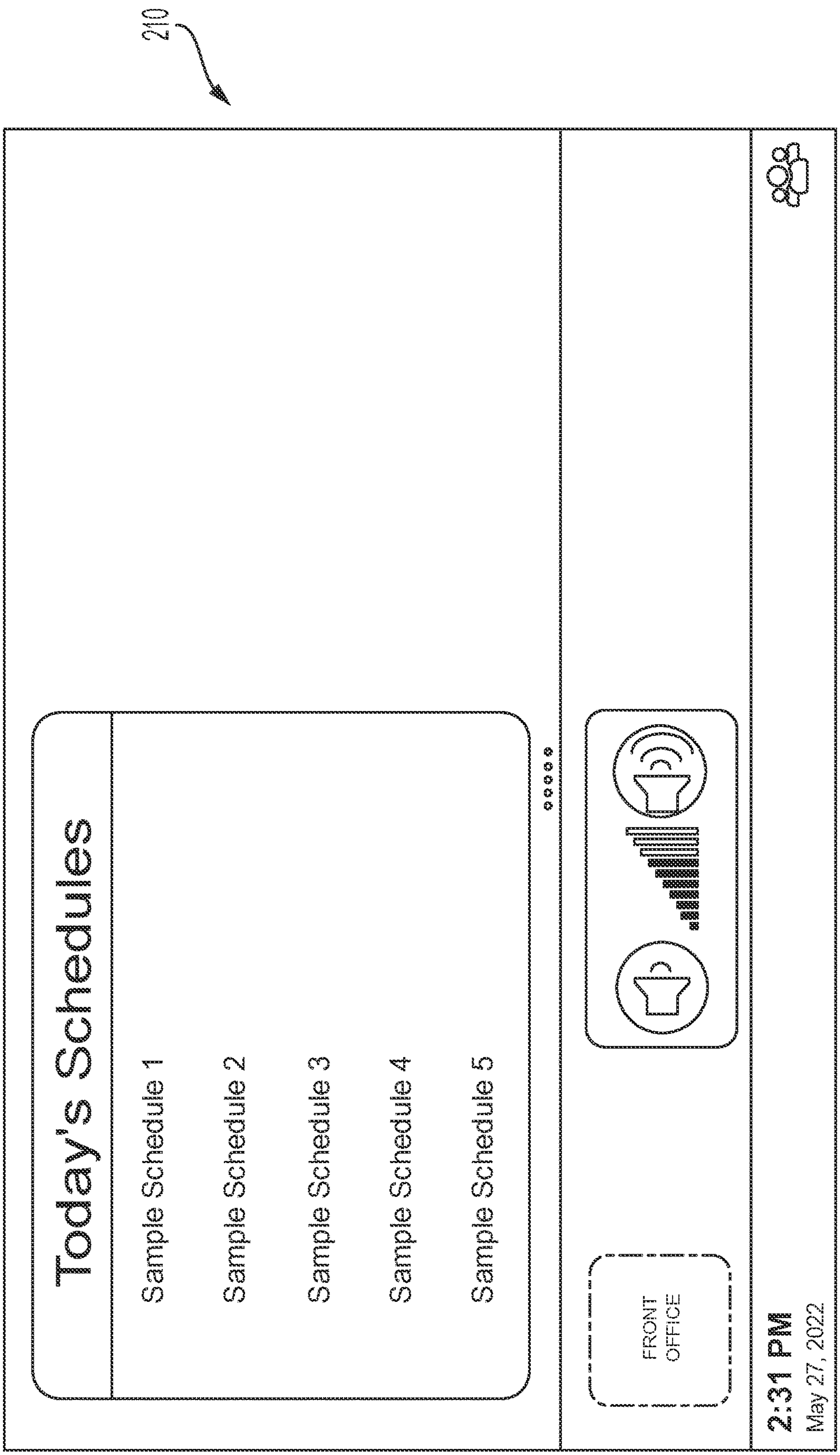

Further, regarding Informational widgets, a Schedules widget is provided. In certain embodiments, the Schedules widget is a 4×3 widget designed to display active bell schedules for the campus 108*a* (see FIG. 1). In certain embodiments, the Schedules widget can display multiple bell schedules. For example, in some embodiments, five or more schedules can be shown on the Schedules widget. If there are no active bell schedules for a day, the Schedules widget will show "No Active Schedules." In certain embodiments, the Schedules widget will refresh each day, and, if there are schedule changes that occur during the day, the Schedules widget will refresh with the most current active bell schedules. FIG. 13 provides an exemplary embodiment of a user interface showing the Schedules widget including five schedules displayed.

Figure 14:
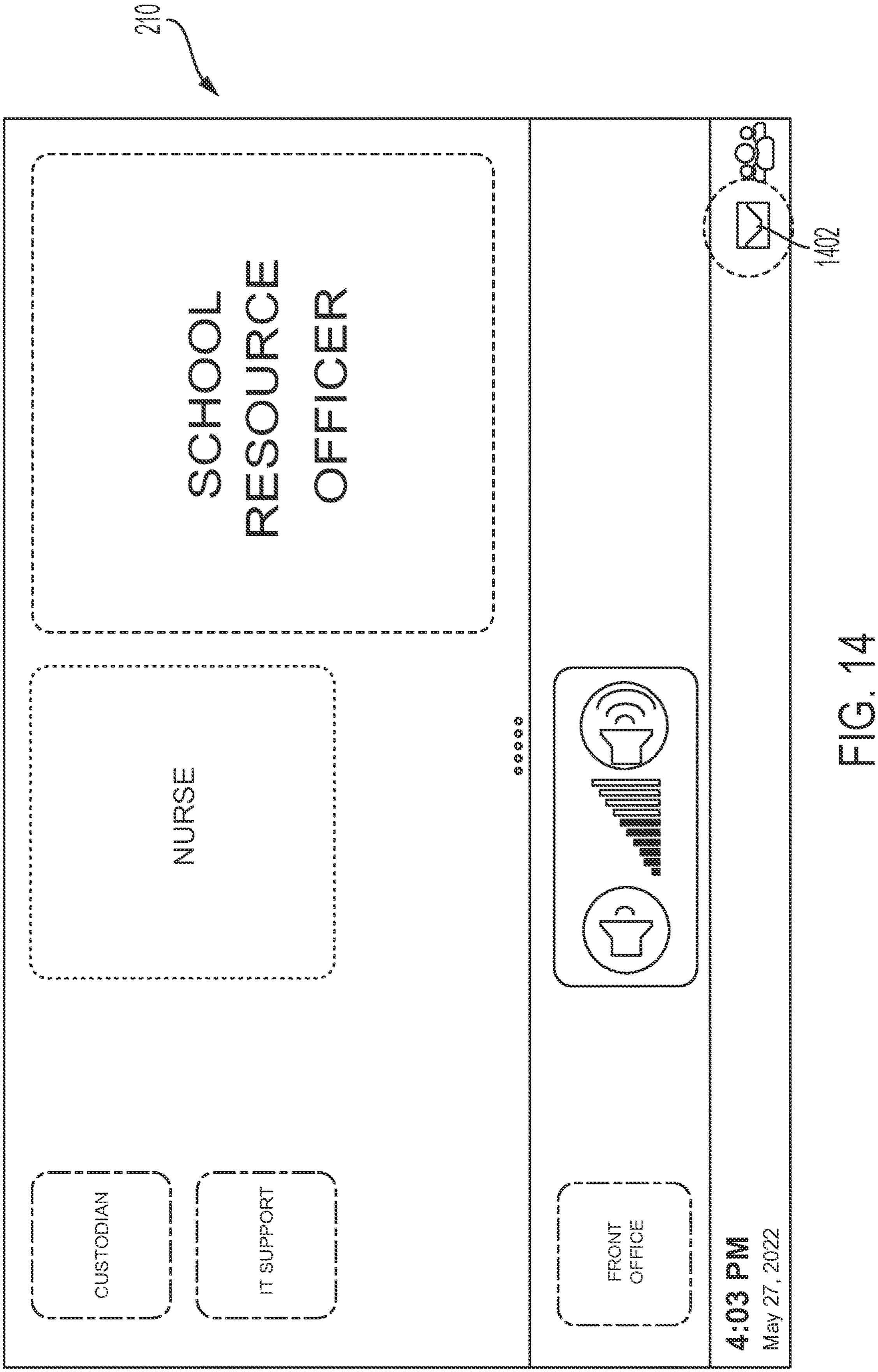

Additionally, regarding Informational widgets, room communication kiosk 210 messages are non-emergency text messages readable on the room communication kiosk 210 touchscreen. In some embodiments, room communication kiosk 210 messages are not configured like other widgets. The room communication kiosk 210 messages screen is a readable pane accessible by pressing a button in the room communication kiosk 210 status bar region specifically set up to access a user's messages. When a new message is sent to a room communication kiosk 210, a new message icon appears in the status bar region. FIG. 14 illustrates a user interface of the room communication kiosk 210 with the new message icon 1402 provided. Pressing this button will open a reading pane for the user to read the message. In certain embodiments, messages at the room communication kiosk 210 may be sorted, with a most recent message at the top of the list of messages and each message being time stamped.

Figure 15:
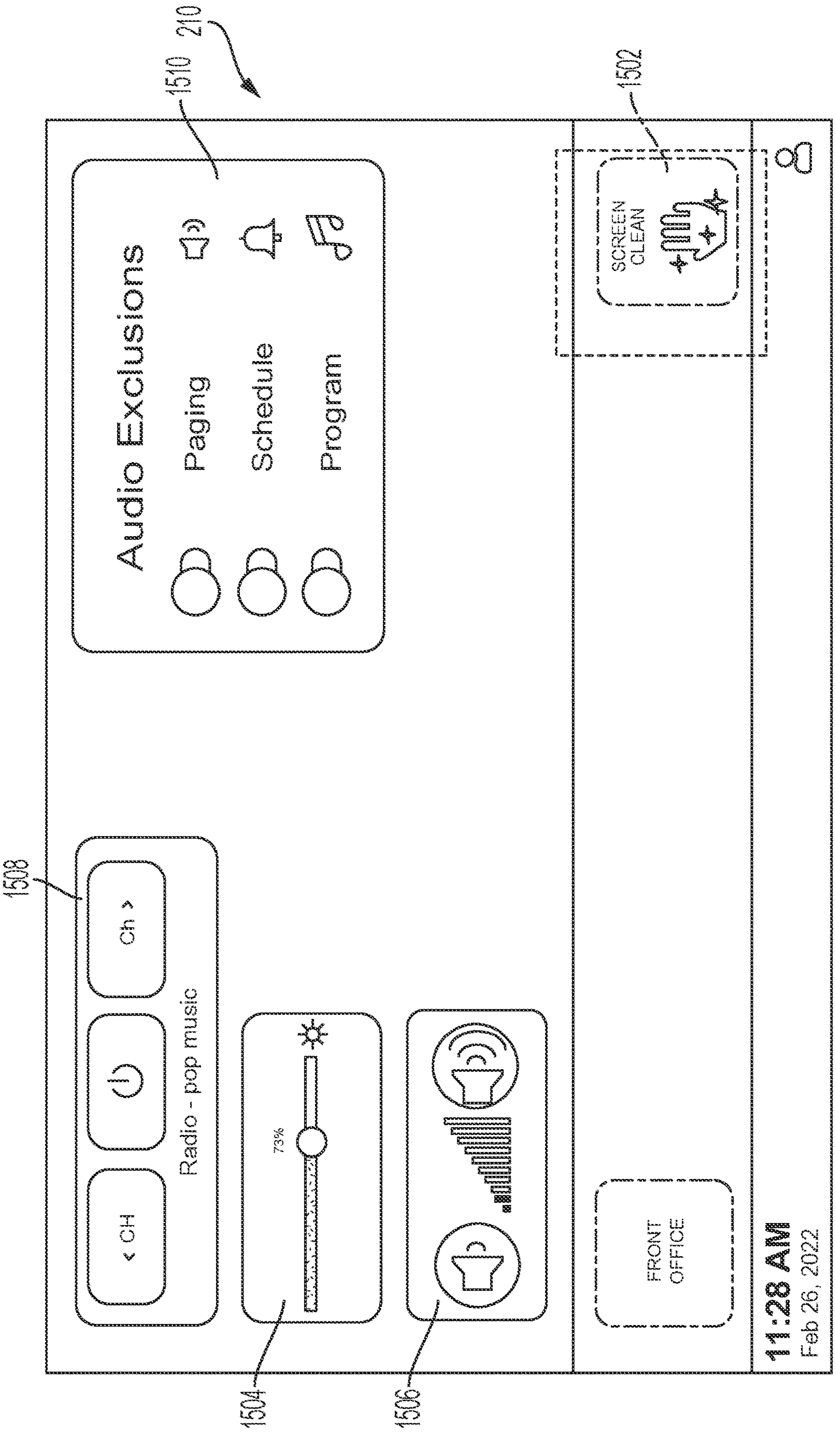

The room communication kiosk 210 is further configured with Local Controls widgets. Local Controls widgets include Screen Clean, Brightness, Volume, Program Distribution, Room Audio Controls, and Timer/Stopwatch. FIG. 15 illustrates an exemplary embodiment of a user interface of the room communication kiosk 210 showing the widgets for Screen Clean 1502, Brightness 1504, Volume 1506, Program Distribution 1508, and Room Audio Controls 1510. In the illustrated embodiment, the Screen Clean widget 1502 is a 1×1 widget designed to temporarily disable all touch functionality of the room communication kiosk 210 for custodial staff to sanitize the touchscreen without inadvertently activating any of the features. In an exemplary embodiment, pressing the Screen Clean widget 1502 will activate a 10-second cycle that blocks all room communication kiosk 210 functionality. Upon completion of the cycle, all room communication kiosk 210 functionalities will resume.

In the illustrated embodiment of FIG. 15, the Brightness widget 1504 is a 2×1 widget and allows a user to increase or decrease the brightness level of the touchscreen. In the illustrated exemplary embodiment, the Brightness widget 1504 has a slider bar that can be adjusted left or right to set the desired brightness. The brightness level ranges from 0% to 100%, and, as a user drags the slider, the slider becomes illuminated to track its movement.

In the illustrated embodiment of FIG. 15, the Volume Control widget 1506 is a 2×1 widget designed to increase or decrease the volume of a speaker of the room communication kiosk 210. In the illustrated embodiment, pressing the volume up/down buttons will increase and decrease the corresponding volume levels. In certain embodiments, the Volume Control widget 1506 may adjust audio played from the room speaker 208 (see FIG. 2).

In the illustrated embodiment of FIG. 15, the Program Distribution widget 1508 is a 3×1 widget designed to activate the program distribution (music) channel to a corresponding location of the room communication kiosk 210. The Program Distribution widget 1508 allows a user to sort through the available program channels and stream that audio to the associated room speaker 208 (see FIG. 2) or a speaker of the room communication kiosk 210.

In the illustrated embodiment of FIG. 15, the Room Audio Exclusions widget 1510 is a 3×2 widget designed to temporarily mute (exclude) paging, schedule, or program channel audio to the corresponding room communication kiosk 210. Each audio type can be independently controlled with its own toggle. When a toggle is set, that specific audio will be temporarily muted—or excluded—from being heard on the room communication kiosk 210 itself or its associated room speaker 208 (see FIG. 2). Each toggle can be set in two positions: either on or off.

Figure 16:
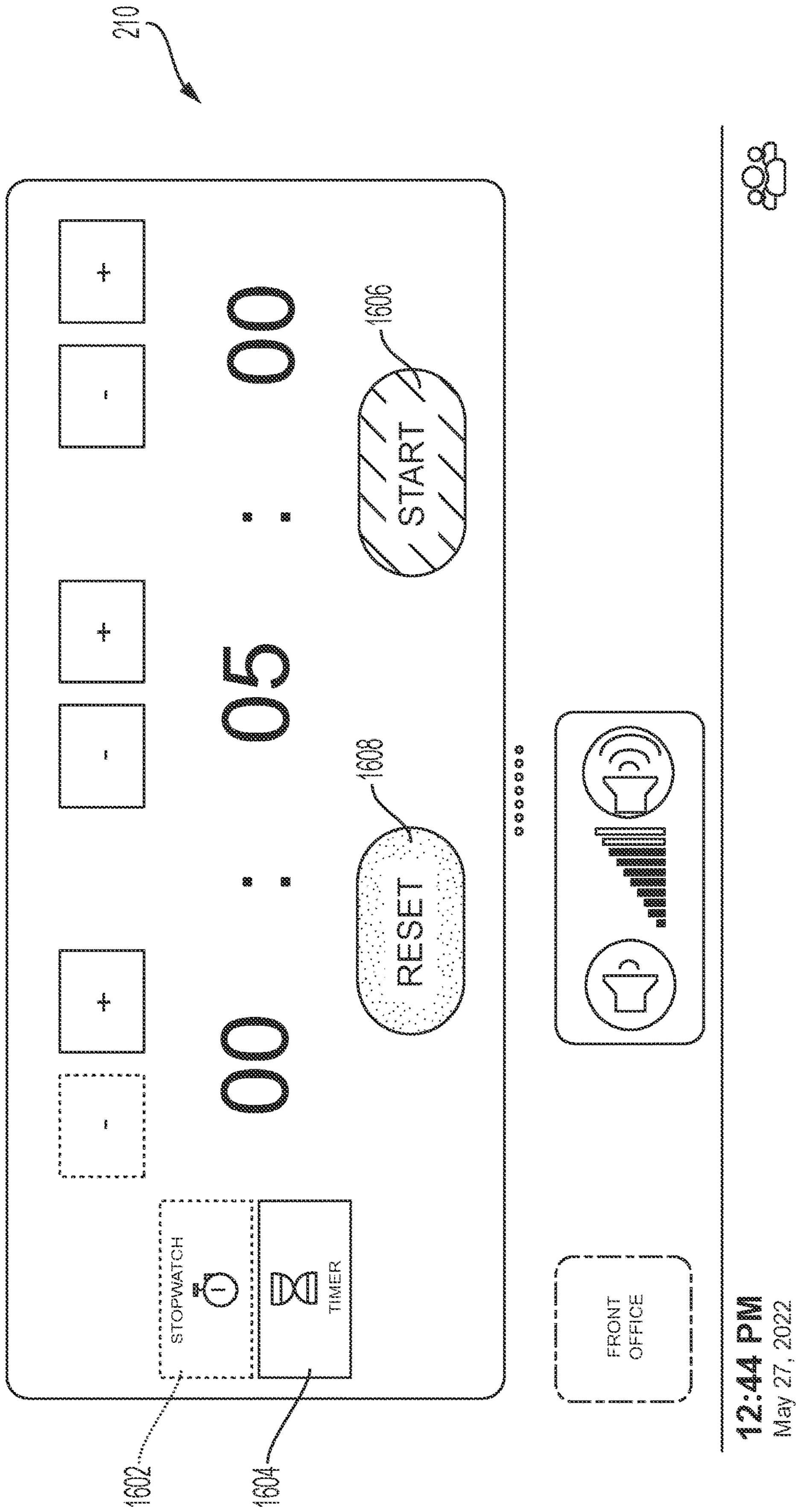

FIG. 16 illustrates an exemplary embodiment of the user interface of the room communication kiosk 210 showing a Timer/Stopwatch widget. In the illustrated embodiment, the Timer/Stopwatch widget is a 7×3 widget that allows a user to implement a count up/down mechanism for students and/or staff to be used for activities like testing, arts and crafts, recess, etc. Switching between timer and stopwatch modes is done by tapping on toggle buttons 1602 and 1604. In Timer mode, the Timer/Stopwatch widget will count down from a specified start time. In certain embodiments, once the Timer reaches zero the widget will cease counting and an audible beep is heard. In Stopwatch mode, the Timer/Stopwatch widget will count from zero. Each mode offers a START/STOP button 1606 as well as a RESET button 1608. In certain embodiments, the Timer/Stopwatch widget will begin counting when START button 1606 is pressed, and the button 1606 will change to read STOP to become a STOP button 1606. In certain embodiments, tapping the STOP button 1606 during an active count will pause the widget count and convert the button back to a START button 1606. A user can resume the count by pressing the START button 1606. Tapping a RESET button 1608 will reset the Timer/Stopwatch widget to its beginning time (either zero for stopwatch or the configured count down for timer).

The above description of the room communication kiosk is made with respect to certain embodiments of this disclosure used within a school environment. However, as previously discussed, other embodiments of the room communication kiosk that are not limited to use within a school environment are contemplated. For instance, a room communication kiosk in accordance with the above description may be used in other environments, such as office buildings, clinics, or any facility with rooms or spaces and/or hallways where visual indication of room/zone status may be desirable. Accordingly, it is contemplated that any building, room within a building, or any space in general that may utilize interactive communication and room/system functionality is within the scope of the disclosure contained herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A room communication kiosk integrated within a campus communication system, the campus communication system providing integrated communication services for a plurality of rooms within a campus integrating the campus communication system, the room communication kiosk comprising:

- a housing configured for installation within a room of the plurality of rooms within the campus;
- a power interface configured to provide power to the room communication kiosk;
- a network interface configured to communicate with the campus communication system;
- a speaker configured to play audio signals from the campus communication system;
- a microphone configured to accept audio input from the room;
- a touchscreen device configured to:
  - display one or more user function widgets on the touchscreen, wherein the one or more user function widgets displayed on the touchscreen are selected for inclusion on the touchscreen based on a location of the touchscreen device within the campus;
  - sense one or more user touch gestures interacting with the one or more user function widgets displayed on the touchscreen; and
  - generate a signal responsive to the one or more user touch gestures; and
- a processor configured to:
  - receive the signal responsive to the one or more user touch gestures;
  - interpret the signal responsive to the one or more user touch gestures based on the one or more user function widgets to determine a kiosk action for the campus communication system; and communicate the kiosk action to the campus communication system over the network interface;

wherein the one or more user function widgets displayed on the touchscreen comprise workflow widgets and information widgets;

wherein the workflow widgets automate workflow functionality of the campus communication system at the room communication kiosk, the workflow functionality comprises: call-in functionality, emergency initiation functionality, and room attribute functionality; and wherein the information widgets display campus communication system information on the touchscreen, the campus communication system information comprises one or more of: emergency response information, campus schedule information, and room specific information for a room containing the room communication kiosk.

2. The room communication kiosk of claim 1, wherein multiple user profiles are accessible at the room communication kiosk, wherein each user profile of the multiple user profiles causes the touchscreen to display a particular configuration of the one or more user function widgets.

3. The room communication kiosk of claim 2, wherein the multiple user profiles comprise public profiles, standard profiles, and override profiles;

wherein the public profiles are available to all users and configured by the campus communication system;

wherein the standard profiles are configured for a specified user level and accessible via entrance of a Personal Identification Number (PIN) at the touchscreen; and wherein the override profiles are configured for administrative personnel interacting with the campus communication system and configured to provide administrative widgets of the one or more user function widgets to the administrative widgets upon entrance of an administrative PIN.

4. The room communication kiosk of claim 1, wherein the one or more user function widgets displayed on the touchscreen further comprise local control widgets.

5. The room communication kiosk of claim 4, wherein the local control widgets control local functionality of the room communication kiosk.

6. A networked campus communication system, the system comprising:

a district server configured to manage at least one communication system located within a campus managed by the district server;

a district network configured to communicatively couple the at least one communication system and the district server; and a user interface configured to allow access to the district server to control the at least one communication system;

wherein the at least one communication system comprises:

a network switch configured to integrate communication equipment associated with the campus into the at least one communication system;

a campus controller communicatively coupled to the network switch and configured to control the communication equipment associated with the campus;

a room controller communicatively coupled to the campus controller and configured to control room communication equipment of a room within the campus; and a room communication kiosk, the room communication kiosk comprising:

a housing configured for installation within a room of a plurality of rooms within the campus;

a power interface configured to provide power to the room communication kiosk;

a network interface configured to communicate with the at least one communication system;

a speaker configured to play audio signals from the at least one communication system;

a microphone configured to accept audio input from the room;

a touchscreen device configured to:

display one or more user function widgets on the touchscreen, wherein the one or more user function widgets displayed on the touchscreen are selected for inclusion on the touchscreen based on a location of the touchscreen device within the campus;

sense one or more user touch gestures interacting with the one or more user function widgets displayed on the touchscreen; and generate a signal responsive to the one or more user touch gestures; and a processor configured to:

receive the signal responsive to the one or more user touch gestures;

interpret the signal responsive to the one or more user touch gestures based on the one or more user function widgets to determine a kiosk action for the at least one communication system; and communicate the kiosk action to the at least one communication system over the network interface;

wherein the one or more user function widgets displayed on the touchscreen comprise workflow widgets and information widgets;

wherein the workflow widgets automate workflow functionality of the campus communication system at the room communication kiosk, the workflow functionality comprises: call-in functionality, emergency initiation functionality, and room attribute functionality; and wherein the information widgets display campus communication system information on the touchscreen, the campus communication system information comprises one or more of: emergency response information, campus schedule information, and room specific information for a room containing the room communication kiosk.

7. The networked campus communication system of claim 6, wherein multiple user profiles are accessible at the room communication kiosk, wherein each user profile of the multiple user profiles causes the touchscreen to display a particular configuration of the one or more user function widgets.

8. The networked campus communication system of claim 7, wherein the multiple user profiles comprise public profiles, standard profiles, and override profiles;

wherein the public profiles are available to all users and configured by the campus communication system;

wherein the standard profiles are configured for a specified user level and accessible via entrance of a Personal Identification Number (PIN) at the touchscreen; and wherein the override profiles are configured for administrative personnel interacting with the campus communication system and configured to provide administrative widgets of the one or more user function widgets to the administrative widgets upon entrance of an administrative PIN.

9. The networked campus communication system of claim 6, wherein the one or more user function widgets displayed on the touchscreen further comprise local control widgets.

10. The networked campus communication system of claim 9, wherein the local control widgets control local functionality of the room communication kiosk.

11. A campus communication system for a campus with a plurality of rooms, the system comprising:

a campus controller configured for controlling communication equipment associated with the campus; and a room, communication kiosk communicatively coupled to the campus controller through a network switch;

wherein the room communication kiosk comprises:

a housing configured for installation within a room of the plurality of rooms within the campus;

a power interface configured to provide power to the room communication kiosk;

a network interface configured to communicate with the campus communication system;

a speaker configured to play audio signals from the campus communication system;

a microphone configured to accept audio input from the room;

a touchscreen device configured to:

display one or more user function widgets on the touchscreen, wherein the one or more user function widgets displayed on the touchscreen are selected for inclusion on the touchscreen based on a location of the touchscreen device within the campus;

sense one or more user touch gestures interacting with the one or more user function widgets displayed on the touchscreen; and generate a signal responsive to the one or more user touch gestures; and a processor configured to:

receive the signal responsive to the one or more user touch gestures;

interpret the signal responsive to the one or more user touch gestures based on the one or more user function widgets to determine a kiosk action for the campus communication system; and communicate the kiosk action to the campus communication system over the network interface;

wherein the one or more user function widgets displayed on the touchscreen comprise workflow widgets and information widgets;

wherein the workflow widgets automate workflow functionality of the campus communication system at the room communication kiosk, the workflow functionality comprises: call-in functionality, emergency initiation functionality, and room attribute functionality; and wherein the information widgets display campus communication system information on the touchscreen, the campus communication system information comprises one or more of: emergency response information, campus schedule information, and room specific information for a room containing the room communication kiosk.

12. The campus communication system of claim 11, wherein multiple user profiles are accessible at the room communication kiosk, wherein each user profile of the multiple user profiles causes the touchscreen to display a particular configuration of the one or more user function widgets.

13. The campus communication system of claim 12, wherein the multiple user profiles comprise public profiles, standard profiles, and override profiles;

wherein the public profiles are available to all users and configured by the campus communication system;

wherein the standard profiles are configured for a specified user level and accessible via entrance of a Personal Identification Number (PIN) at the touchscreen; and wherein the override profiles are configured for administrative personnel interacting with the campus communication system and configured to provide administrative widgets of the one or more user function widgets to the administrative widgets upon entrance of an administrative PIN.

14. The campus communication system of claim 11, wherein the one or more user function widgets displayed on the touchscreen further comprise local control widgets.

15. The campus communication system of claim 14, wherein the local control widgets control local functionality of the room communication kiosk.

* * * * *